(12) United States Patent
Rector

(10) Patent No.: US 6,590,596 B1
(45) Date of Patent: Jul. 8, 2003

(54) RIGHT CLICK FOR TASK BAR CONTENT

(75) Inventor: Dusty Dale Rector, Southlake, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/316,325

(22) Filed: May 21, 1999

(51) Int. Cl.[7] .............................................. G06F 7/00
(52) U.S. Cl. ...................................... 345/810; 345/763
(58) Field of Search ................................ 345/762, 765, 345/808, 835, 810, 841, 840, 763

(56) References Cited

U.S. PATENT DOCUMENTS

| | | | | |
|---|---|---|---|---|
| 5,630,080 A | * | 5/1997 | Malamud | 345/804 |
| 5,805,167 A | * | 9/1998 | van Vruyningen | 345/841 |
| 6,229,539 B1 | * | 5/2001 | Morcos | 345/810 |
| 6,292,813 B1 | * | 9/2001 | Wolfe | 707/513 |
| 6,421,694 B1 | * | 7/2002 | Nawaz et al. | 707/526 |
| 6,483,500 B1 | * | 11/2002 | Choi et al. | 345/184 |

OTHER PUBLICATIONS

Jacquelyn Gavron and Joseph Moran, How To Use Microsoft, Windows NT 4 Workstation, Copyright @ 1996.*

* cited by examiner

Primary Examiner—Cao (Kevin) Nguyen
(74) Attorney, Agent, or Firm—Nathan Grebach; Mark S. Walker

(57) ABSTRACT

The present invention teaches a method, user interface and system configured to present task bar content to a user in a menu activated through the use of a single right mouse click.

20 Claims, 5 Drawing Sheets

RIGHT CLICK FOR TASK BAR CONTENT

FIELD OF THE INVENTION

The present invention relates generally to graphical user interfaces and more particularly to menu option presentations in graphical user interfaces.

BACKGROUND OF THE INVENTION

In a graphical user interface (GUI) environment like Windows 98/95, open applications are typically reflected in the task bar. In order to maximize or bring focus to one of these applications, the user must move their cursor to the task bar, locate the button that represents the desired application, and click on that button. This method is not ideal in that it often requires a considerable amount of movement to accomplish this task.

Windows 98/95 also offers an alternative means to accomplish this same task. This alternative method requires the user to utilize the keyboard and further involves requiring the user to press an 'alt-tab' key combination which forces the presentation of a menu of icons representing the current set of open applications. The user must then continue to hold down the 'alt' key and press the 'tab' key to select an icon from the menu. This alternative method is both complicated and taxing in that it requires keyboard usage as well as multi-key combinations. Another drawback of this alternative method is that the icons on the menu do not always make it abundantly clear which open application each icon represents.

What is needed is a method, user interface and system capable of providing a user convenient access to open applications. Additional functionality needed includes allowing menu access from any environment and presenting open application choices to a user in a clear and obvious manner.

SUMMARY OF THE INVENTION

Accordingly, the present invention provides a method comprising the steps of displaying a cursor on at least a portion of a display, and displaying a menu on at least a portion of the display, wherein the position of the menu on the display is dependent on the location of the cursor displayed on the display, and wherein the menu is comprised of at least one item indicative of at least one open application.

The present invention further provides a user interface configured to display a cursor on at least a portion of a display, and display a menu on at least a portion of the display, wherein the position of the menu on the display is dependent on the location of the cursor displayed on the display, and wherein the menu is comprised of at least one item indicative of at least one open application.

The present invention also provides a system comprising at least one processor, memory operably associated with the processor, and a user interface configured to display a cursor on at least a portion of a display, and display a menu on at least a portion of the display, wherein the position of the menu on the display is dependent on the location of the cursor displayed on the display, and wherein the menu is comprised of at least one item indicative of at least one open application.

Within the scope of present invention is a computer readable medium tangibly embodying a program of instructions configured to display a cursor on at least a portion of a display, and display a menu on at least a portion of the display, wherein the position of the menu on the display is dependent on the location of the cursor displayed on the display, and wherein the menu is comprised of at least one item indicative of at least one open application.

Within the scope of present invention is a signal embodied in a propagation medium comprising at least one instruction configured to display a cursor on at least a portion of a display, and at least one instruction configured to display a menu on at least a portion of the display, wherein the position of the menu on the display is dependent on the location of the cursor displayed on the display, and wherein the menu is comprised of at least one item indicative of at least one open application.

It is an object of the present invention to provide a menu containing options indicative of open applications.

It is another object of the present invention to provide an easily accessed menu of open applications.

The present invention provides the advantage of providing easy access to open applications regardless of the current operating environment.

The present invention also provides the advantage of presenting an easily accessed, informative, and useful menu activated by a single right mouse button click.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information appreciable by those skilled in the art. The following detailed description is, therefore, not to be taken in a limiting sense, and the scope of the present invention is defined only by the appended claims.

Figure 1:
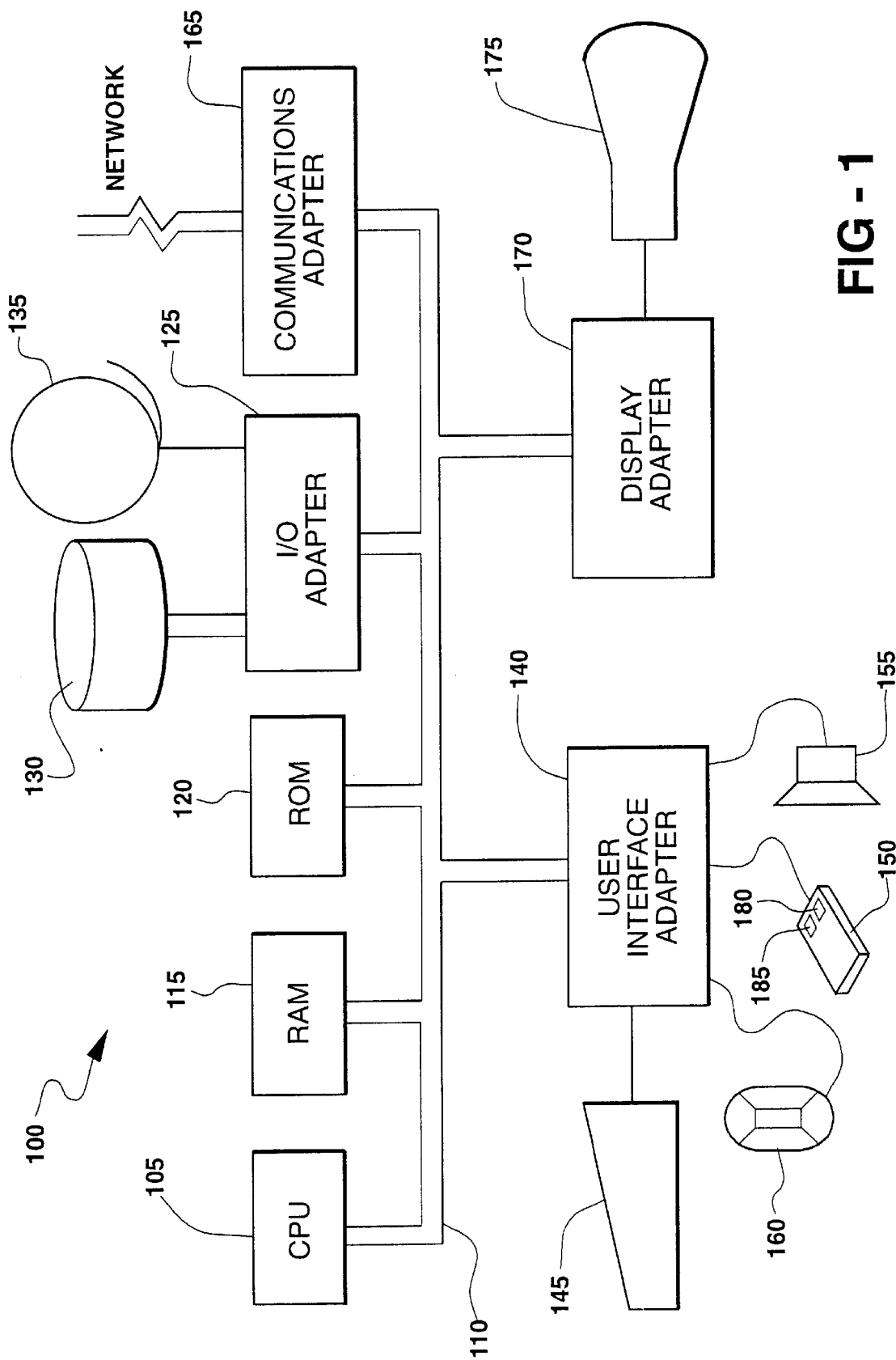
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes random access memory (RAM) 115, read only memory (ROM) 120, and input/output (I/O) adapter 125 for connecting peripheral devices such as disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 100 to an information network such as the Internet, and display adapter 170 for connecting system bus 110 to a display device such as monitor 175. Mouse 150 has a series of buttons 180, 185 and is used to control a cursor shown on monitor 175.

Figure 2:
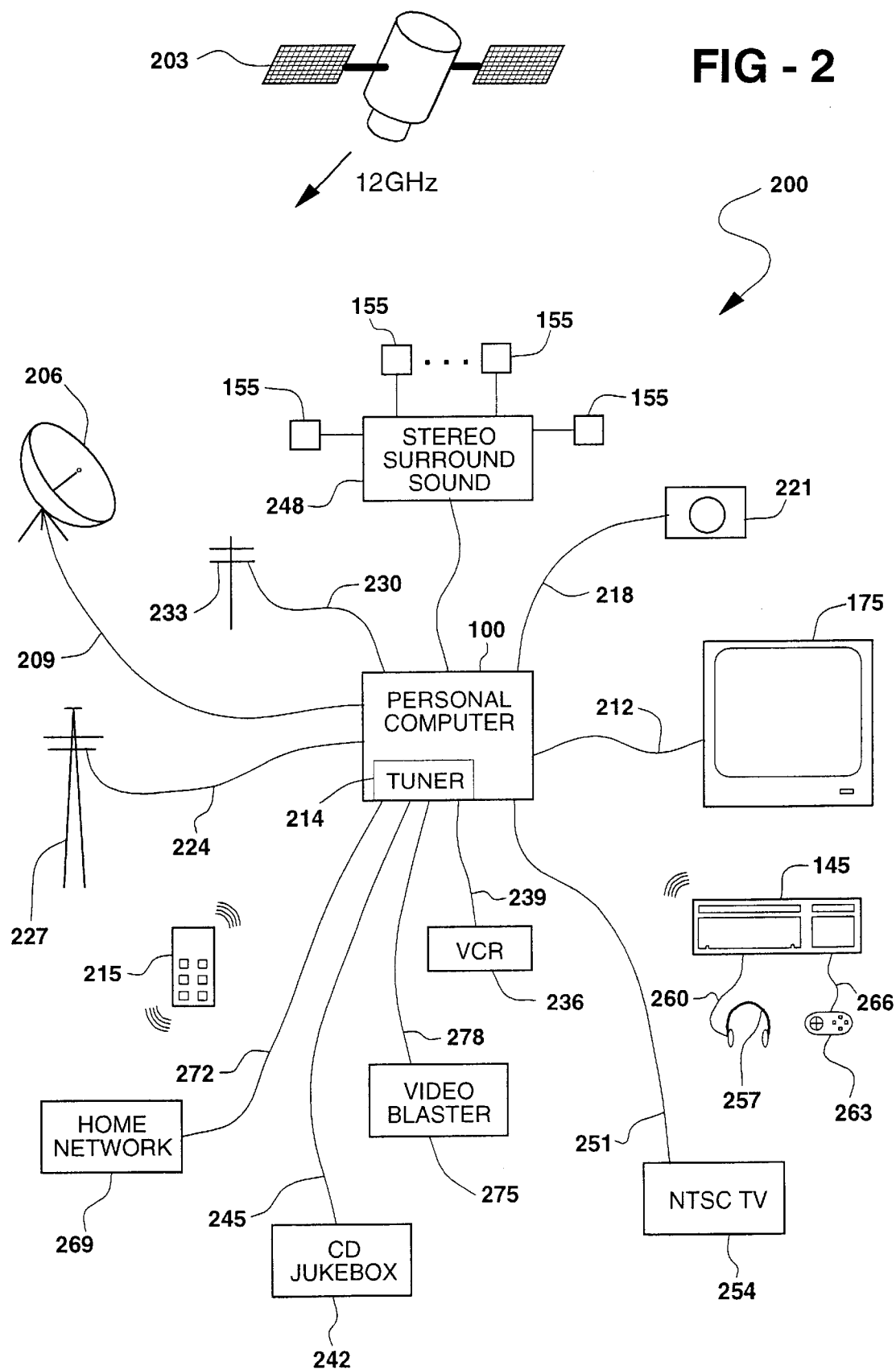
FIG. 2 illustrates a detailed block diagram showing a convergence system according to the preferred embodiment of the present invention.

Referring next to FIG. 2, a home entertainment or convergence system, such as the Gateway Destination System mentioned above, is shown generally at 200. Reference numerals or letters in FIG. 2 which are like, similar, or identical to the reference numerals or letters of FIG. 1 indicate like, similar, or identical components or features. External to convergence system 200, is satellite 203, which in one preferred embodiment is a HS601 model, operated by Hughes at a 101 degree west longitude geosynchronous orbital location, transmits signals comprising 150 channels of modulated digital video, audio, and data at a frequency of about 12 GHz. The satellite signals are received by home entertainment system 200 through antenna 206 containing a low noise block converter amplifier. Antenna 206 is preferably about 18 inches in diameter and receives left and right hand circularly polarized signals between 12.2 and 12.7 GHz. Antenna 206 provides a "downconverted-spectrum" signal between 950 and 1450 MHZ via a coaxial cable or other suitable communication medium 209 to information handling system 100, such as a personal computer or other system or circuitry capable of processing data. Suitable antennas 206 are already being manufactured and sold by RCA Corporation via direct sales and through numerous major retail chains such as Radio Shack.

System 100 contains circuitry and software to further process signals from the antenna, generally demodulating and decoding the signal to produce a VGA (video graphics adapter) signal. The VGA signal is provided via a standard VGA compatible monitor cable to drive large screen data quality monitor 175 which is suitable for viewing in a family room or entertainment room environment. System 100 provides for user input by means of remote controls 215 and 145. Remote control 215 comprises a handheld size device with standard television controls and a numeric keypad, and in one embodiment, VCR (video cassette recorder) controls and a pointing device. It provides RF (radio frequency) or IR (infrared) control signals received by system 100. Remote control 145 is a full function personal computer keyboard with additional standard television and VCR controls, a pointing device which is preferably in the form of a touchpad, and it also provides RF control signals to system 100. RF control signals were selected over IR control signals or hardwired connections in one embodiment due to the home entertainment environment. RF control allows the system to be in a different room from monitor 175, or if in the same room, a clear line of sight is not required. In another embodiment, IR control signals were selected because of the standard circuitry available at a low cost. Monitor cable 212 is a standard type cable typically used on VGA display devices, and comprises up to fifteen electrical conductors, interfacing with monitor 175 in a D-series shell connector. In one embodiment, full multi-media sourcing and destinationing of audio/video/data (A/V/D) broadcast is provided for.

Information handling system 100 may include a tuner, tuner circuitry 214, or card capable of both tuning to multiple channels and receiving television information or signals in the form of the NTSC (National Television Standards Committee) or PAL (Phase Alteration Line) forms, from any medium such as from a cable system or from a digital satellite system. One embodiment of the signal on cable 209 from satellite dish 206 provides digital A/V/D signals from such sources as DirecTV or Primestar (DirecTV is a trademark of DirecTV, Inc. and Primestar is a trademark of Primestar Partners, L.P.). In another such embodiment, the signal on cable 209 provides analog A/V such as NTSC (National Television Systems Committee) antenna signals. In another such embodiment, the signal on cable 218 from camera 221 provides analog A/V such as NTSC audio/video signals. In further embodiments, the signal on cable 224 from cable-data source 227 provides analog and/or digital A/V/D. In further such embodiments, the signal on cable 230, from PSTN (Public Switched Telephone Network) 233, provides data or phone signals such as ISDN (integrated services digital network) or POTS (plain old telephone system) signals. In one set of such embodiments, system 100 is programmed to automatically record analog signals, such as television programming, onto recordable media, such as a video tape in VCR 236 coupled to cable 239. In another such set of embodiments, system 100 is programmed to automatically record digital signals, such as digital television programming, Digital Versatile Disk—Read Only Memory (DVD-ROM) or CD-ROM (Compact Disk—Read Only Memory) type audio, onto recordable media, such as recordable compact disks, in CD/DVD jukebox 242 coupled to cable 245. CD/DVD jukebox 242 also plays DVDs and CDS or CD-ROMs for use elsewhere. In another such embodiment, signals are sent to stereo surround sound system 248 for audio output to one or more speakers 155, and on cable 251 to TV 254. In one such embodiment, earphones 257 on cable 260 and gamepad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 266 can be wired coupling or wireless, such as RF or IR.

One example of convergence system 200 is the Destination System using the DestiVu user interface manufactured and sold by Gateway 2000, Inc. In this manner, convergence system 200 is a fully functional computer integrated with a television, providing TV viewing (via broadcast, cable, satellite, VCR, digital disk, or other broadcast media) and personal computing functionality. This convergence of computer and television enables a user the combined access to both television programs and information, as well as computer related functionality such as computer information and programs, and Internet access.

Although many of today's televisions employ much of the same hardware resources employed by computers, such as information handling system 100, it is possible that the present invention might be practiced in other electronic devices or in networked electronic devices. For example, with the development of audio/video networking, such as the recently proposed HAVi standard, television sets or other audio/video devices, such as audio/video receivers and VCRs, that do not themselves contain such resources, could implement the present invention by utilizing the resources of other devices on a network.

Figure 3:
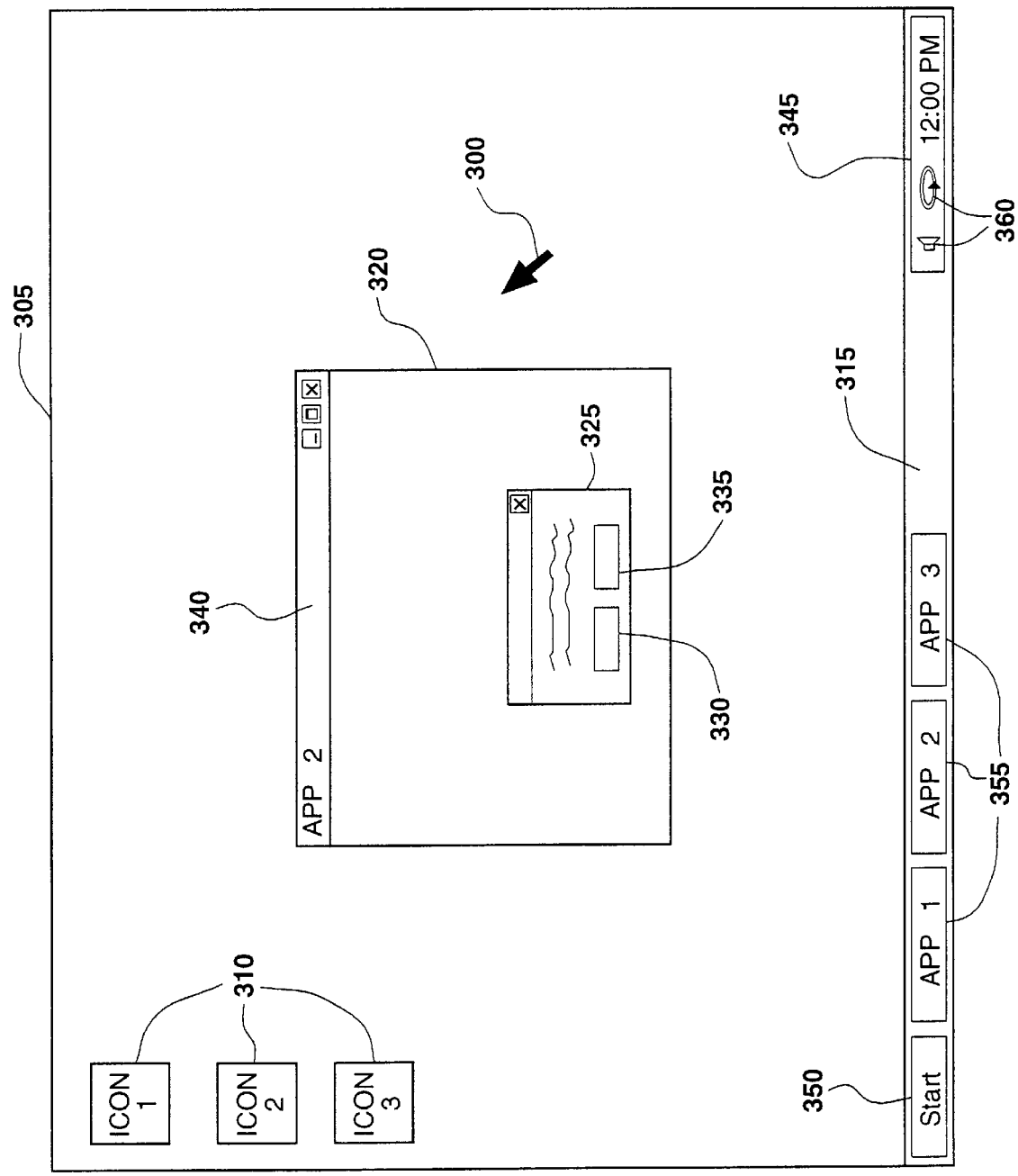
FIG. 3 shows the desktop of a computer operating system's user interface, typically employed on a computer system as in FIGS. 1 and 2, according to the preferred embodiment of the present invention.

Referring next to FIG. 3, a detail of an operating system's graphical user interface, or GUI, as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is Windows 98/95 (Windows 98/95 are trademarks of Microsoft Corporation), however, the present invention will work with DestiVu, OS/2, (DestiVu is a trademark of Gateway 2000 Inc. and OS/2 is a trademark of International Business Machines Corporation), or any other graphical user interface. This GUI includes cursor 300, desktop 305, icons 310, window 320, task bar 315, and dialog box 325, all of which can be appreciated by persons skilled in the art. Task bar 315 further contains 'Start' button 350, open applications buttons 355, system tray 345 which is further comprised of open application icons 360 all of which can be appreciated by persons skilled in the art. Dialog box 325 further contains two buttons 330, 335. Programs are represented by the graphical user interface as either icons 310 or window 320. The horizontal region along the top of a window is called the "title bar" 340. A program window 320 has the "focus" when it has been designated by the user or by the operating system to receive input from keyboard 145 or mouse 150. In Windows 98/95, the user gives the window focus by clicking a mouse button 180, 185 when cursor 300 is inside that window. Some operating systems, however, give a window the focus whenever cursor 300 is present within that window. In Windows 98/95, the operating system indicates which program has the focus by changing the color of the focused window's title bar 340, while other operating systems with graphical user interface may use other visual indicators of which program has the focus, as can be appreciated by those skilled in the art.

The present invention, in its preferred embodiment, is implemented as a program of instructions and therefore the following detailed description assumes this implementation. As can be appreciated by those skilled in the art, many different modules and many different sequences of code can be implemented to achieve the functions detailed herein as well as is the possibility of and/or for generating hardware specific coding allowing for the optimization of specific hardware resources. With this in mind, the following detailed description avoids discussing any specific modules or sequences of code and relies only on detailing the functions by which the present invention, in its preferred embodiment, can be practiced.

Figure 4:
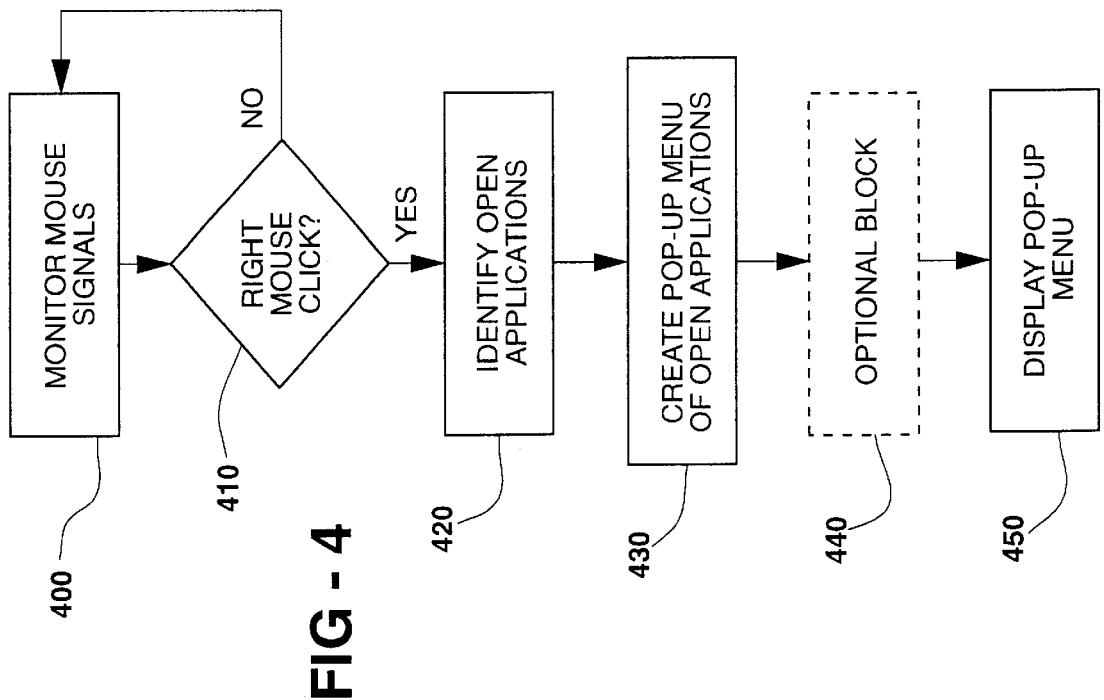
FIG. 4 illustrates a block diagram detailing the method of the preferred embodiment of the present invention's implementation.

Referring next to FIG. 4, a detailed block diagram illustrating a method of menu generation in accordance with the preferred embodiment of the present invention is pictured. Reference numerals or letters in FIG. 4 which are like, similar, or identical to the reference numerals or letters of FIGS. 1–3 indicate like, similar, or identical components or features. The present invention begins in module 400 by monitoring the signals generated from mouse 150, such as a movement signal, left button click signal, right mouse button click, signal, etc. As each mouse signal is received, module 410 checks each signal to determine if the signal was the result of a right mouse button click. If the current signal is determined to be a signal other than a right mouse click signal, the present invention returns to module 400 and continues to monitor for the next mouse signal generated. If module 410 determines that the current mouse signal is a right mouse click signal, module 420 is notified and begins its execution. Module 420 is designed to check system 100/200 and identify any and all open applications. Upon open application identification, module 430 is then signaled and provided with an open applications list which it will then use to create a pop-up menu for presentation. Optional block 440 is included to increase the functionality of the present invention and will be discussed in a later paragraph. As its name implies, optional block 440 can be removed from FIG. 4 to create one alternative embodiment of the present invention. Once module 430 has created a pop-up menu for presentation, skipping optional block 440 for now, module 450 then displays the pop-up menu, on attached display 175 for example, for the user. One convenience of the present invention involves the location at which module 450 displays the pop-up menu. As will be illustrated in FIG. 6, the pop-up menu is displayed in close proximity to the location of cursor 300. This method of display reduces the distance the user must move cursor 300 in order to access task bar 315 content. Within the pop-up menu, is a series of buttons and/or icons indicating to the user what applications are currently open.

Figure 5:
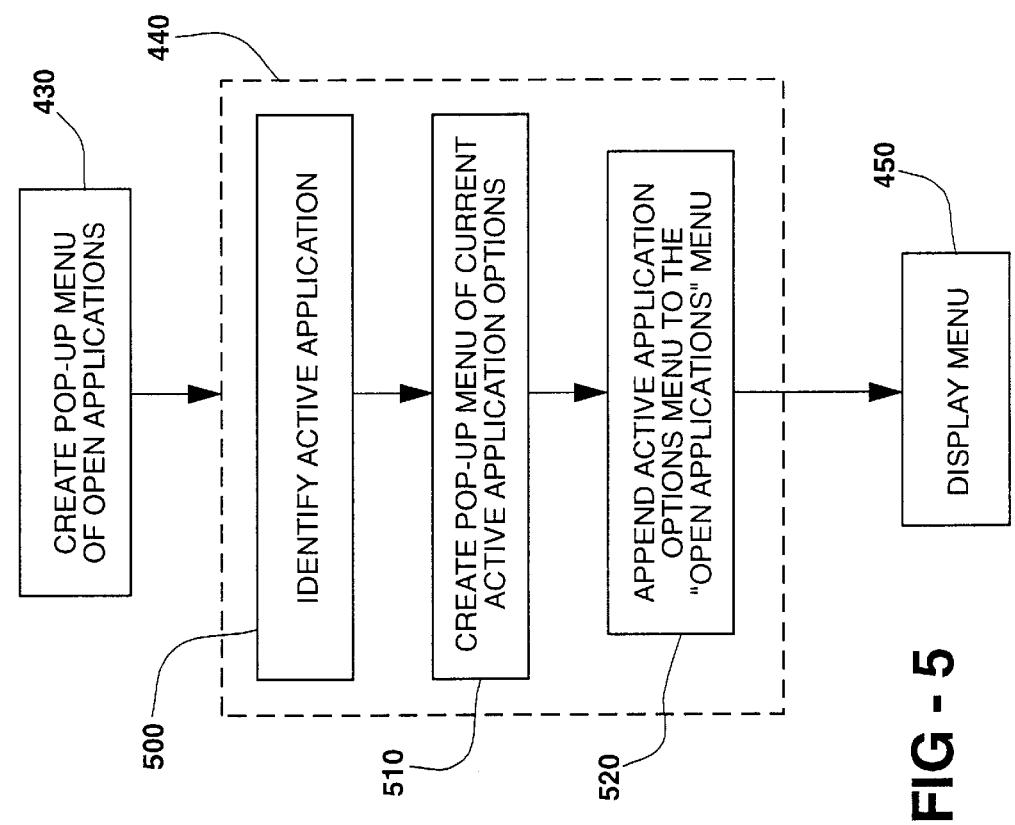
FIG. 5 illustrates a block diagram detailing the method of the 'Optional Block' illustrated in FIG. 4.

Referring next to FIG. 5, a detailed block diagram of the optional block 440 of FIG. 4 in accordance with the preferred embodiment of the present invention is illustrated. Reference numerals or letters in FIG. 5 which are like, similar, or identical to the reference numerals or letters of FIGS. 1–4 indicate like, similar, or identical components or features. Following from the previous paragraph, now assuming optional block 440 is employed, we can jump back into the routine detailed in FIG. 4 at the point where module 430 has created an open applications menu for presentation. After module 430 is complete with its operation, module 500 of optional block 440 proceeds to determine which of the open applications identified by module 420 is the active or focus application. Upon identification by module 500, module 510 is then designed such that it will seek out and identify what the current options are for the active application and then create a menu of these options for presentation. Options might include Save, Copy, Paste, Delete, Properties, etc. Upon option identification and menu creation, module 520 then appends the active application option menu to the open applications menu created by module 440. Once this composite menu has been created, module 450 then displays the menu to the user again, in close proximity to the location of cursor 300 on display 175.

Figure 6:
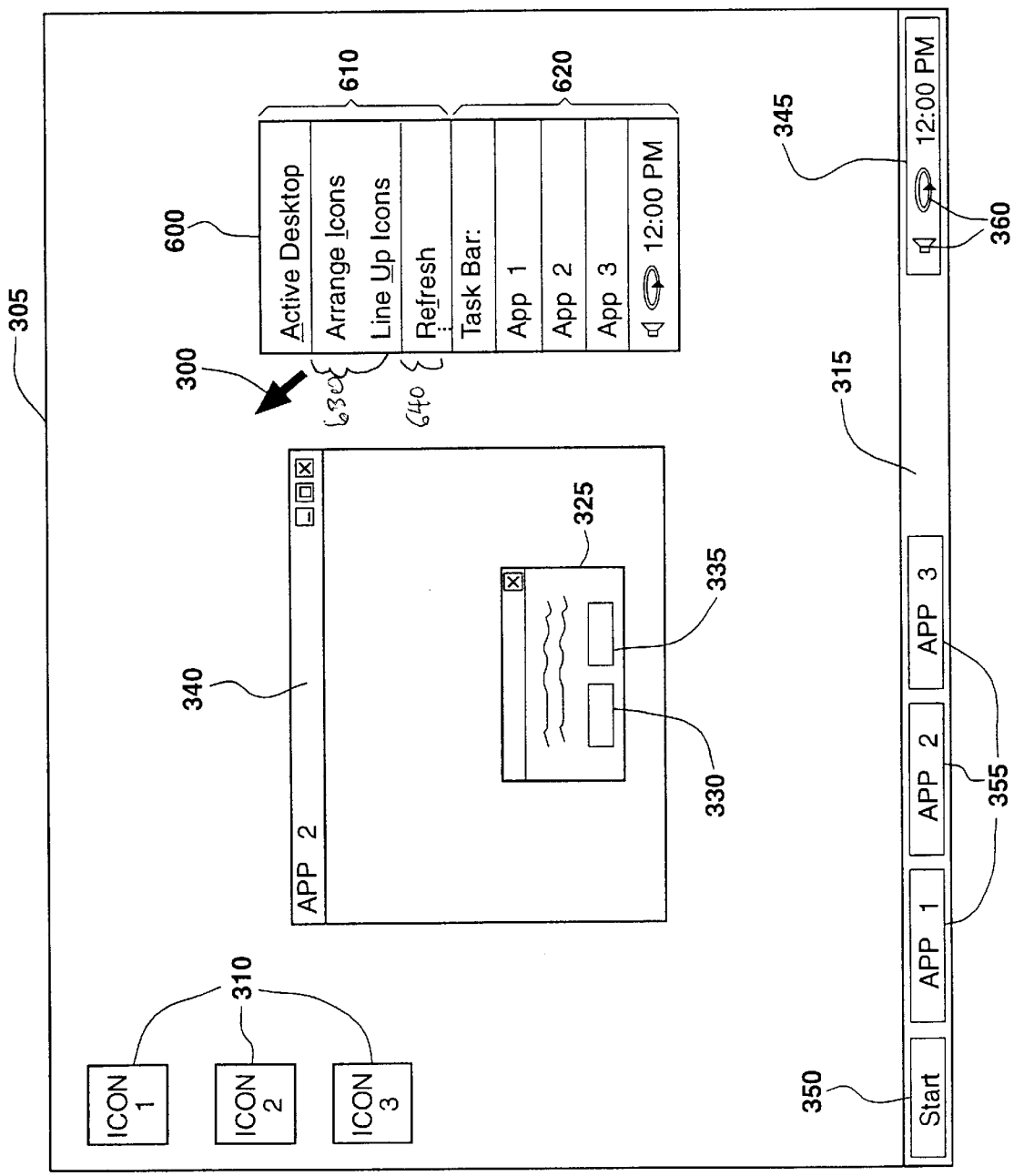
FIG. 6 illustrates a desktop of a system, as illustrated in FIGS. 1 and 2, employing the present invention according to the preferred embodiment.

Referring next to FIG. 6, desktop 305 of an operating system's graphical user interface employing the present invention in accordance with the preferred embodiment of the present invention is illustrated. Reference numerals or letters in FIG. 6 which are like, similar, or identical to the reference numerals or letters of FIGS. 1–5 indicate like, similar, or identical components or features. FIG. 6 illustrates the desktop of FIG. 3 employing the present invention. Pop-up menu 600 was generated by following the method illustrated in FIGS. 4–5 and detailed in the preceding paragraphs. Pop-up menu 600 is comprised of two sections. Section 610 represents the active application options identified by module 500 of FIG. 5. The active application options 610 include static elements 630 intrinsic to the operating system graphic user interface, such as "Arrange Icons" and "Line Up Icons" as illustrated in FIG. 6, as well as application specific options 640, represented in FIG. 6 by "Refresh" and vertical ellipsis. It is understood by those skilled in the art that application specific options 640 vary according to the application to which they apply. Section 620 of pop-up menu 600 represents the open applications identified by module 420 of FIG. 4. System tray 345 is included in the open applications menu due to the fact that icons 360 contained therein represent open applications which can be maximized or made to be the active application just as the open application buttons 355 are maximized or made to be the active application. Section 610 has active application options which indicate that the 'desktop,' as is known in Windows operating systems, is the active or focus application. Start button 350 is intentionally left off of pop-up menu 600 in this embodiment, however, other embodiments are possible which can incorporate start button 350 in section 620 of pop-up menu 600.

In summary, the present invention, in its preferred embodiment, begins by monitoring the system for signals generated from an attached mouse. Upon receiving a signal indicative of a right mouse button click, the present invention proceeds to identify which applications are currently open on the system. When the open applications have been identified, the present invention creates a pop-up menu to present the open applications The present invention also identifies the active application out of the set of open applications. Once the active application has been identified, the present invention then consults that application to determine what options are currently available therein. As all the pertinent data, current options from active application, is accumulated, the present invention creates an active application options menu and appends that menu to the open applications menu. This composite menu displays a series of open application access buttons and a series of active application options to the user for their selection and utilization with the added convenience of being displayed within close proximity to the cursor.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–6. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

I claim:

1. A method comprising the steps of:

displaying a cursor on at least a portion of a display; and displaying a menu on at least a portion of the display; wherein the position of the menu on the display is dependent on the location of the cursor displayed on the display; and wherein the menu is comprised of at least one item indicative of at least one open application.

2. The method, as defined in claim 1, wherein the display of the menu is activated by a right mouse button click.

3. The method, as defined in claim 1, further comprising identifying an active application.

4. The method, as defined in claim 3, further comprising identifying at least one option available from said active application.

5. The method, as defined in claim 4, wherein the menu further comprises at least one entry indicative of the at least one active application option.

6. The method, as defined in claim 1, wherein the menu comprises task bar content.

7. The method, as defined in claim 1, wherein the menu is comprised of at least two items indicative of at least two open applications obtained from an identification of open applications.

8. A user interface configured to:

display a cursor on at least a portion of a display; and display a menu on at least a portion of said display; wherein the position of said menu on said display is dependent on the location of the cursor displayed on said display; and wherein said menu is comprised of at least one item indicative of at least one open application.

9. The user interface, as defined in claim 8, wherein said display of said menu is activated by a right mouse button click.

10. The user interface, as defined in claim 8, further configured to identify an active application.

11. The user interface, as defined in claim 10, further configured to identify at least one option available from said active application.

12. The user interface, as defined in claim 11, wherein said menu further comprises at least one entry indicative of said at least one active application option.

13. The user interface, as defined in claim 8, wherein said menu comprises task bar content.

14. The user interface, as defined in claim 8, wherein the menu is comprised of at least two items indicative of at least two open applications obtained from an identification of open applications.

15. A system comprising:
   at least one processor;
   memory operably associated with said processor; and
   a user interface configured to:
      display a cursor on at least a portion of a display; and
      display a menu on at least a portion of said display;
         wherein the position of said menu on said display is dependent on the location of the cursor displayed on said display; and wherein
         said menu is comprised of at least one item indicative of at least one open application.

16. The system, as defined in claim 15, wherein said display of said menu is activated by a right mouse button click.

17. The system, as defined in claim 15, wherein said user interface is further configured to identify an active application.

18. The system, as defined in claim 17, wherein said user interface is further configured to identify at least one option available from said active application.

19. The system, as defined in claim 18, wherein said menu further comprises at least one entry indicative of said at least one active application option.

20. The system, as defined in claim 15, wherein said menu comprises task bar content.

* * * * *